United States Patent [19]

Standiford

[11] 4,287,019
[45] Sep. 1, 1981

[54] APPARATUS AND METHOD FOR ADIABATIC FLASHING OF LIQUIDS

[76] Inventor: Ferris C. Standiford, 2713 S. North Bluff Rd., Greenbank, Wash. 98253

[21] Appl. No.: 191,446

[22] Filed: Sep. 26, 1980

Related U.S. Application Data

[63] Continuation-in-part of Ser. No. 612,736, Sep. 12, 1975, abandoned.

[51] Int. Cl.³ .............................................. B01D 1/06
[52] U.S. Cl. ................................. 159/2 MS; 159/6 R; 159/49; 159/13 A; 202/173
[58] Field of Search ............ 159/6 R, 18, 24 R, 13 A, 159/2 MS, 4 TR, 49; 202/173

[56] References Cited

U.S. PATENT DOCUMENTS

| | | | |
|---|---|---|---|
| 1,862,069 | 7/1932 | Subkow | 159/18 |
| 2,894,879 | 7/1959 | Hickman | 159/18 |
| 3,312,601 | 4/1967 | Wilson et al. | 159/18 |
| 3,486,743 | 12/1969 | Todd | 159/6 R |
| 3,567,591 | 3/1971 | Othmer | 159/18 |
| 3,583,895 | 6/1971 | Othmer | 159/2 MS |
| 3,595,298 | 7/1971 | Enders | 159/6 R |
| 3,725,209 | 4/1973 | Rosa | 159/6 R |
| 4,018,656 | 4/1977 | Rogers | 159/2 MS |

FOREIGN PATENT DOCUMENTS

339608 8/1959 Fed. Rep. of Germany ............ 202/236

Primary Examiner—Hiram Bernstein

[57] ABSTRACT

An apparatus and method for the adiabatic flashing of liquids and more particular, to flashing in a series of sequential stages to obtain vapor at successively lower pressure for each succeeding stage. A common application of such flashers is in the multistage flash process for desalination of sea water and brackish water.

9 Claims, 14 Drawing Figures

APPARATUS AND METHOD FOR ADIABATIC FLASHING OF LIQUIDS

CROSS RELATED APPLICATION

This application is a Continuation in Part of my copending Ser. No. 612,736, filed Sept. 12, 1975, now abandoned all the teachings of which are hereby incorporated by reference.

BACKGROUND OF THE INVENTION AND PRIOR ART

The multiple stage flashing of liquids has been most thoroughly developed in connection with the multistage flash (MSF) process for desalting of saline waters. This is the best accepted and most widely used desalination process and hence is most thoroughly covered in the patent literature. All known present-day MSF plants are basically horizontally arranged, so the brine can flow from one stage to the next simply as a result of the usual vapor pressure differences developed between stages. The flashing itself occurs simply in empty vessel space, unaided by mechanical means. An example of patents in this field is U.S. Pat. No. 2,944,599 (July 12, 1960, to A. Frankel), which illustrates the arrangement normally used. It consists simply of an opening at the bottom of the partition between two stages and an overflow weir in the downstream stage. Sometimes the stages are arranged at successively lower elevations (as U.S. Pat. No. 3,337,419, Aug. 2, 1967, to A. Kogan) to aid in brine transfer from one stage to the next. Others include adjustable weirs or gates to control the flow rate of brine between stages and hence avoid the risk of vapor bypassing from one stage to the next (as U.S. Pat. No. 3,172,824, Mar. 9, 1965, to S. L. Mulford). Mechanical means for conveying brine between stages are not now used in practice but are illustrated in U.S. Pat. No. 3,192,132 (June 29, 1965, to F. A. Loebel). This patent is similar to my present invention in that it shows conveying means (propellers) on a common shaft that serve to agitate the brine and promote flashing closer to equilibrium with the pressure in the vapor space. However, the said Leobel patent does not contemplate use of this device for conveying uphill or for flashing within the conveying device itself.

Little has been done to reduce the area required for flashing in these MSF evaporators. U.S. Pat. No. 3,197,387 (July 27, 1965, to H. R. Lawrence), for instance, shows only stationary means for spreading the flashing flow over a larger part of the vessel plan area in order to use this area more effectively. U.S. Pat. No. 3,214,349 (Oct. 26, 1965, to E. C. Keohoe et al.), is typical of a class of patents designed to reduce flash area requirements. However, these require downhill flashing through stationary devices arranged to more effectively separate the liquid from the flash vapor.

The uphill flashing of brine is not necessary in the normal MSF plant but is most desirable in the so-called vapor reheat process. Here, one descending stream must be heated or cooled countercurrently by an ascending stream, with the heat being transferred by flashing of one stream and direct condensation of the flashed vapor in the other stream. It usually matters little which stream moves uphill. Most concepts of this process employ pumps for transferring the stream moving uphill from one stage to the next (as U.S. Pat. No. 3,219,554, Nov. 23, 1965, to H. T. Woodward). Others, such as U.S. Pat. No. 3,249,517 to C. J. Lockman) show flashing of the hot stream uphill by vapor pressure differences and vapor-lift effect alone. Details of experimental work on this uphill flashing method are given by Newson, and Delve, Proc. Third Int'l. Symposium on Fresh Water from the Sea I, 127 (1970) and details of the processes in which the use of this flashing method is appropriate, including the standard MSF process, are given by Walker, Newson, and Johnson, Desalination 2, 96 (1967).

The multistage flash evaporator resulting from use of my invention possesses many novel flash devices exposed to successively lower pressures. Even though these units may be in direct communication with one another through their liquid connections, the pressure differences are maintained as an inherent function of the MSF evaporation cycle. Such maintenance will subsequently be shown in regard to FIGS. 1 and 5 herein.

In summary, although attempts have been made to move flashing brine uphill, to reduce the surface area required for flashing, and to achieve a closer approach to equilibrium between the flashing liquid and the flashed vapor and to flash foaming liquids, none have been able to do all these at one time whereas my device can do all or any of these in a positive and yet simple manner.

The flash devices of my invention are intended to provide a number of vapor streams at successively lower temperatures and pressures by exposing a liquid sequentially to successively lower pressures in each successive flash device. The means of maintaining these successively lower pressures are outside the scope of the invention but are well understood in the art. In brief, they involve condensing or absorbing the vapor by direct or indirect heat exchange contact with heat sinks at successively lower temperatures. The flash devices will be described primarily as used in a multistage flash evaporator since the means of maintaining these successively lower pressures here are most widely understood, having been extensively described in the literature and in patents, such as those listed above.

OBJECTS OF THE INVENTION

A primary objective of the invention is thus to accomplish the flashing of the liquid and the separation of the evolved vapor from the remaining liquid in a much smaller volume than normally required.

A further objective of the invention is to accomplish this flashing without carry-over of foam with the vapor as might otherwise occur when the liquid contains surface active ingredients.

An additional object of my improvement is to convey the flashing liquid from one stage to the next in a positive manner, even when the liquid must travel to a higher elevation to reach the next stage.

Another object of my invention is to achieve efficient separation of liquid and evolved vapor even when the equipment is subject to motion as would be encountered aboard a marine vessel.

A further objective of my improvement over the art is to provide a closer approach to equilibrium in the flasher, in other words, to assure that the vapor leaving the flasher is closer to being in equilibrium with the liquid leaving the flasher.

These and other objectives and advantages of the invention will be apparent from the following detailed description thereof.

SUMMARY OF INVENTION

The function and utility of my invention is best illustrated by its application to a multistage flash evaporator for producing potable water from sea water and employing the falling film heating method described in my U.S. Pat. No. 3,494,836. By multistage flash evaporator is meant an apparatus in which impure feedwater and recycled blowdown, is heated through a wide temperature range in stages by condensing vapor at successively higher temperature and absolute pressures. The heated feedwater is then heated further by an external source and then flashed down in stages to successively lower absolute pressures, thereby supplying the vapor needed to heat the feedwater. The condensate of the vapor is then the distilled water output of the apparatus.

In the falling film version of this evaporator, the feedwater is heated as it flows as a film down the walls of the heating surface, which usually comprise the inside walls of vertical tubes, the flow being the result only of the influence of gravity. The heating side of the heating surface, typically the outside walls of the tubes, is zoned to receive and condense the flash vapor from the flash stages, with the vapor from the initial flashing of the heated feedwater going to lower zones than the vapor from subsequent flashings. The flashers shown in the above-mentioned patent were of the conventional type arranged for horizontal flashing liquid flow from stage to stage as is well known in the prior art and as is widely used in practice. However, this type flasher, when used with the falling film heating tubes, requires individual pipes or passages to convey flash vapor to each of the vertically disposed condensing zones.

My present invention permits a major simplification in this multistage flash arrangement, by making it possible to bring the flashing liquid into close proximity to the condensing zones, thereby eliminating need for the interconnecting vapor passages.

DETAILED DESCRIPTION OF THE INVENTION

The invention may be more clearly understood by reference to the accompanying drawings thereof, wherein.

Figure 1:
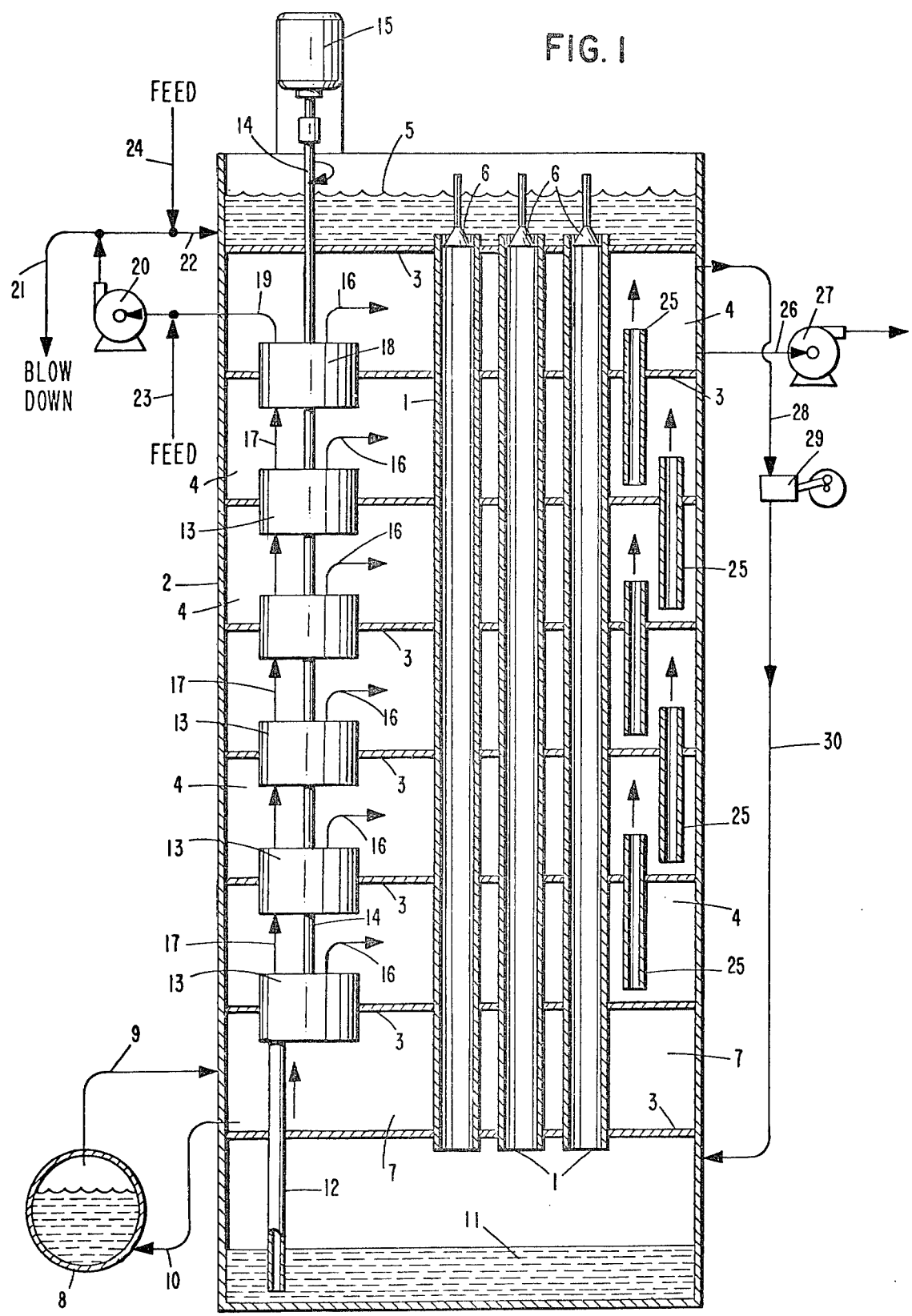
FIG. 1 is a vertical section of an assembly showing in a diagrammatic form how the new flash device can be used in this improved falling film flash evaporator.

FIG. 1 incorporates my present invention with the teachings of my U.S. Pat. No. 3,494,836. As shown in this Figure a nest of vertical tubes 1 comprises the heating surface, which is contained in a shell 2 divided by horizontal partitions 3 into a number of separate condensing spaces 4. Tubes 1 can be conventional smooth tubes or can be of the doubly fluted type described in U.S. Pat. No. 3,244,601 to provide improved heat transfer performance. Although said patent describes improved heat transfer performance for these tubes when the falling film is boiling, I have found that the enhancement of heat transfer is almost as great when these tubes are used only for sensible heating of the liquid, as occurs in my falling film flash evaporator of the present invention. The tubes 1 are fed at their upper end by any generally used means for establishing a film on the surface, as for instance by spray nozzles or simply by gravity feed from a liquid pool 5 through distributors 6 fitted into the top of each tube. The liquid is heated as it flows down the tube wall, the heat being obtained by condensing of vapor on the outside of the tubes. In order that the heat be able to flow from the condensing vapor to the liquid being heated, it is necessary that the vapor be at successively higher temperatures and hence higher pressures in each successively lower condensing space 4. The liquid is given a final boost in temperature by heat from an outside source, which can be done by an external heater or simply by supplying steam to lowermost condensing space 7 by boiler 8 through steam line 9, with the steam condensate being returned to the boiler by line 10. The heated liquid from tubes 1 is collected in sump 11 below the tubes and is then passed by line 12 to flashers 13. (If an external heater is used, it would be interposed in line 12 between the sump and the flashers 13.)

The flashers 13 consist of a series of chambers that either rotate themselves or contain rotating impellers driven by means of a common shaft 14 driven by any suitable means, such as motor 15. The rotation drives the flashing liquid to the outside wall of the flasher and permits escape of vapor 16 from the top, free of substantial amounts of entrained liquid, the vapor thus serving as the heating medium for tubes 1. The liquid flows upward through successive flashers by means of connecting lines 17 and is therefore exposed to the successively lower vapor pressures established in condensing spaces 4 by the liquid flowing downward in tubes 1. Thus liquid from line 12, being hotter than the boiling point at the lowermost condensing space 4 pressure (by reason of the final boost in temperature mentioned above), liberates vapor by flashing, with the vapor then condensing on tubes 1 in the lowermost zone 4. The liquid then liberates additional vapor as it is exposed to successively lower pressures in travelling upward through the remaining flashers, the vapor serving as the heating media in successively higher condensing spaces 4. Thus each flasher is arranged for the relatively unobstructed release of vapor streams 16 at whatever pressure exists in the condensing space to which that flasher is connected. Conversely, connecting lines 17 are arranged to prevent vapor from escaping from one flasher to the next, by means to be described.

The centrifugal head developed by rotation of the liquid in each flasher, plus the vapor pressure differences resulting from the flash cooling, are sufficient to elevate the liquid from one flash stage to the next, through connections 17. Thus the liquid is carried up through the vessel 2 as it flash cools, releasing its vapor at the locations where the vapor is to be condensed. The top flasher 18, possessing the lowermost pressure of the other flashers 13, releases vapor to the uppermost condensing space, where it heats the coolest incoming sea water as it enters the tubes. The liquid from this last flasher is withdrawn by line 19 to pump 20, from which it can be discharged to waste by line 21 or partially recycled by line 22, with makeup feedwater being added by line 23 or line 24. The feed, blowdown, and recycle arrangement shown in FIG. 1 is illustrative only and is for the purpose both of carrying away the net heat input added to the system, as from boiler 8, and for disposing of the impurities dissolved in the feedwater. Other arrangements for connection of feed and blowdown and for rejecting waste heat are well known in the art and may be used with this system.

The vapor from each flasher of FIG. 1 is condensed on tubes 1 and the condensate formed can be collected and its heat content recovered by flashing it successively to the lower pressure condensing spaces above. This can be done most easily by using vent gases from each condensing space 4 to lift the accumulated condensate to the next higher condensing space, as by lines 25, which start just above the floor of one condensing space and end above the floor of the next higher condensing space. These lines can be sized with regard to diameter, or can contain orifices, to pass all the condensate plus the desired volume of vent gases from one condensing space to the next. Alternatively, my flashing devices can be used in slightly modified form to collect and carry the condensate from one condensing space to the next in a more positive manner, independent of vent gas flows. In either case, accumulated condensate or distillate will collect in a cooled condition in the uppermost condensing space, from which it can be withdrawn by line 26 and pump 27. The vent gases will also collect in the uppermost condensing space, from which they can be withdrawn by line 28 and vacuum pump 29. If the feedwater contains temporary hardness and the teachings of my U.S. Pat. No. 3,494,836 are followed, vacuum pump 29 would discharge by line 30 to the sump 11 to return part or all of the $CO_2$ content of the gases into contact with the feedwater as it is being heated in tubes 1, in order to prevent scale formation.

Figure 2:
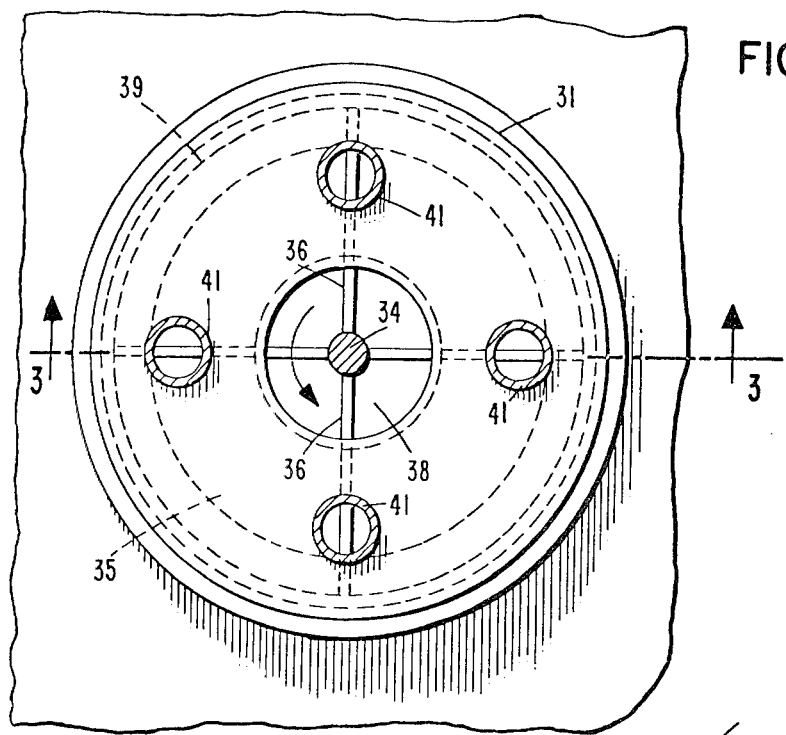
FIG. 2 is a plan view, partially in section, of a preferred embodiment of my typical flash device.
Figure 3:
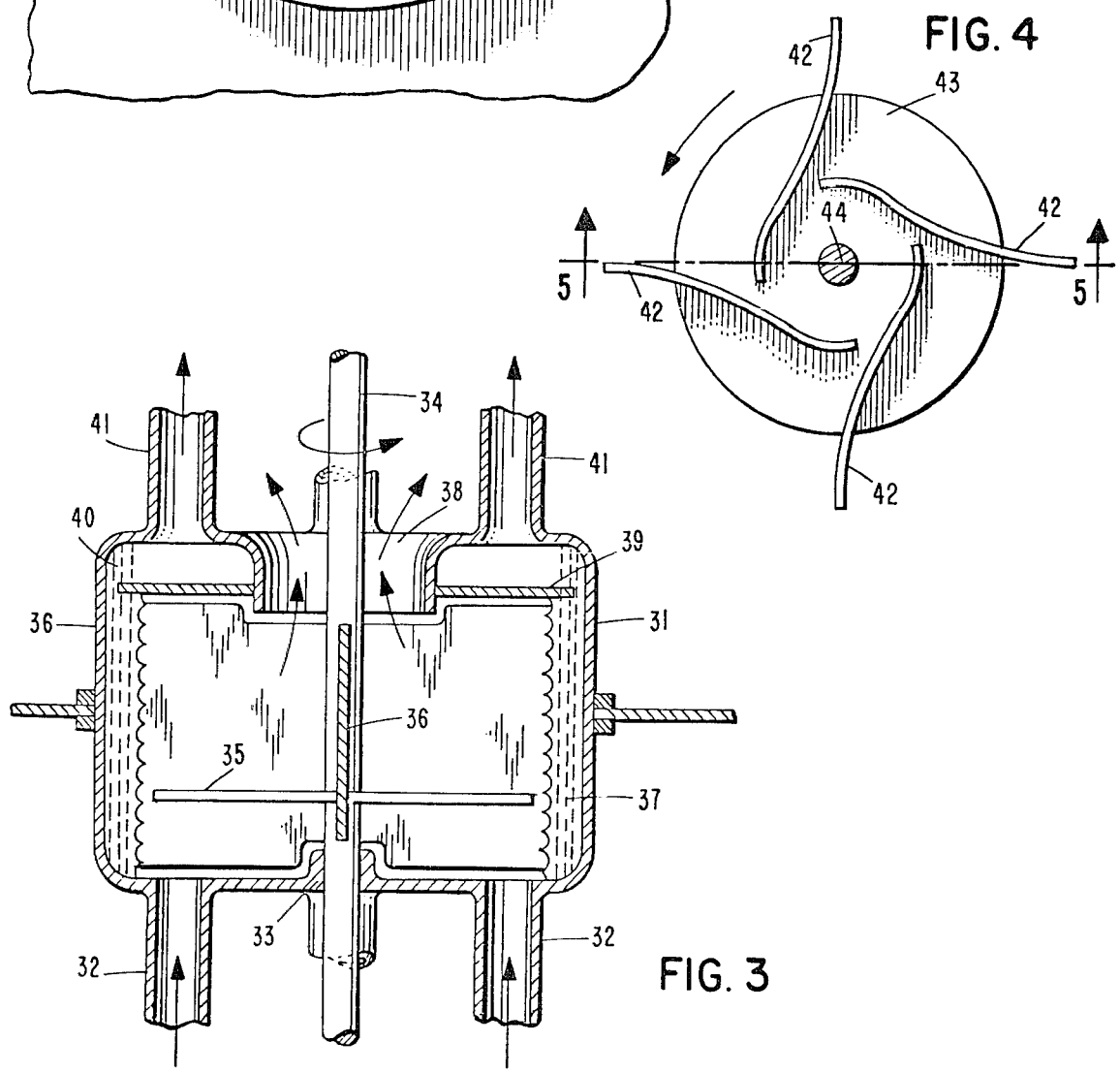
FIG. 3 is a vertical, sectional view of the said typical flash device as represented in FIG. 2 and taken on the line 3—3 of FIG. 2.

FIGS. 2 and 3 show details of a preferred embodiment of one of the flashers 13 of FIG. 1. It consists of a stationary, approximately cylindrical vessel 31, closed at the bottom except for inlet line or lines 32 for the liquid to be flashed and a close fitting seal or bearing 33 for rotating shaft 34. Mounted on the shaft and rotating with it are deflector 35 and blades 36, the blades serving to impart a rotating motion to the flashing liquid, thereby forcing it to the outer wall of vessel 31 and forming a vapor-liquid interface 37. Vapor release occurs primarily from this interface, with the vapor escaping by opening 38, from which it can be led to the place of utilization, as the condensing spaces 4 of FIG. 1. A skimmer plate 39 near the top of vessel 31 is arranged to permit escape only of the liquid through the gap between the outside diameter of the skimmer plate and the inside diameter of the vessel 31. This flashed liquid is then collected in space 40 and withdrawn by line or lines 41 for introduction into the next flasher or for withdrawl from the system.

As can be seen in FIG. 3, the lead needed for transfer of liquid up from one flasher to the next is developed by the centrifugal head of liquid in vessel 31 and this head is dependent on the rotating speed, the diameter of vessel 31, and the "depth" of liquid between interface 37 and the walls of vessel 31. It is obvious that almost any combination of these variables may be used to develop the desired heat for transfer of liquid from one flasher to the next through the system. The factors involved in sizing such units can easily be derived from general principles and need not be described. For one application in a small capacity twenty-eight multistage flash evaporator such as illustrated in FIG. 1, I have found that a vessel size and rotating speed that developed a centrifugal head of about thirty times the force of gravity results in a very compact flasher that gives excellent separation of vapor from the flashed liquid and provides adequate head for transfer of liquid from one flasher to the next. I do not with to be limited in flasher proportioning but do wish to point out that sizing of the flasher ideally should be such that the depth of liquid interface 37 must not be so great as to flood out vapor outlet 38 during startup when there are no vapor pressure differences between flashers to augment the centrifugal heads developed and also that when such vapor pressure differences do develop that liquid interface 37 does not reach the outside diameter of skimmer plate 39, thereby permitting escape of vapor to the next flasher. These results can be accomplished both by proper choice of vessel 31 diameter and rotating speed and by dimensioning skimmer plate 39 gap and transfer line 41 sizes with regard to liquid pressure drop. Other refinements include addition of diffuser vanes in chamber 40 to convert rotating liquid motion into liquid head and the addition of small projections on the tips of rotor blades 36, arranged to sweep through the gap at the outside of skimmer plate 39, thereby keeping it clear of solids that might accompany the flashing liquid.

Figure 4:
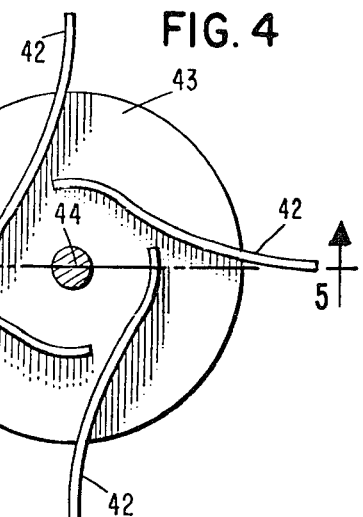
FIG. 4 is a plan view of an impeller that may preferably be used in the flash device as represented in FIG. 2 and that is particularly effective when handling foaming liquids.
Figure 6:
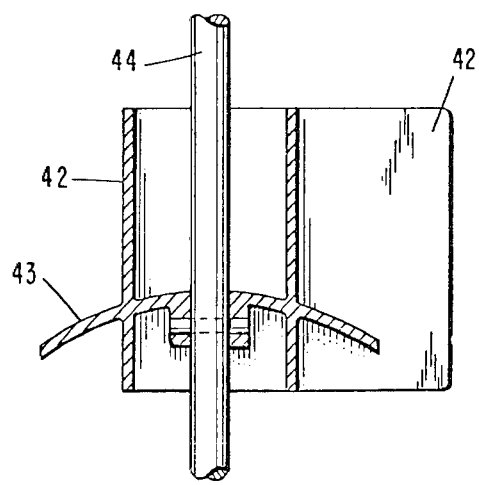
FIG. 6 is a section view of the impeller taken on the line 5—5 of FIG. 5.

It is obvious that almost any type of bladed impeller can be used in vessel 31 of FIG. 2 to impart the necessary rotating motion to the liquid. The impeller design shown in FIGS. 4 and 6 illustrates one configuration that has proven particularly effective for dealing with foaming liquids. In this design, blades 42 are curved in such a manner that the released vapor must travel at a velocity greater than the rotational speed in order to escape and the leading surface of the blades tends to collect the liquid spray. Deflector 43, of inverted disk or convex shape as shown in FIG. 6, serves both to connect blades 42 so shaft 44 and to make the entering liquid travel toward the outer wall of vessel 31 before any vapor-liquid separation can occur. With an impeller of this shape rotating in a 2.8 inch diameter vessel only 1.5 inches high, I was able to separate 4 CFM of air from 4 GPM of foaming liquid (detergent-water solution) at a rotating speed of 1,000 rpm, a result that could not be achieved under static conditions in a vessel having ten times as great a plan area.

Figure 8:
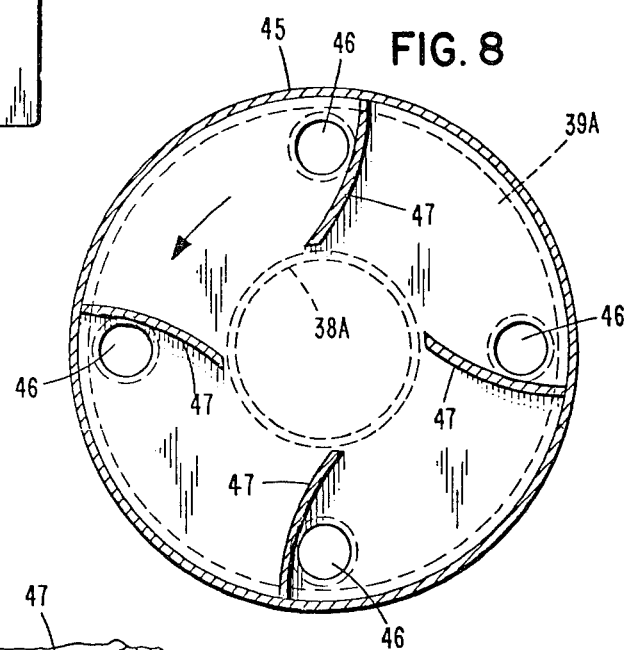
FIG. 8 is a cross-section taken along line 8—8 of FIG. 7.
Figure 7:
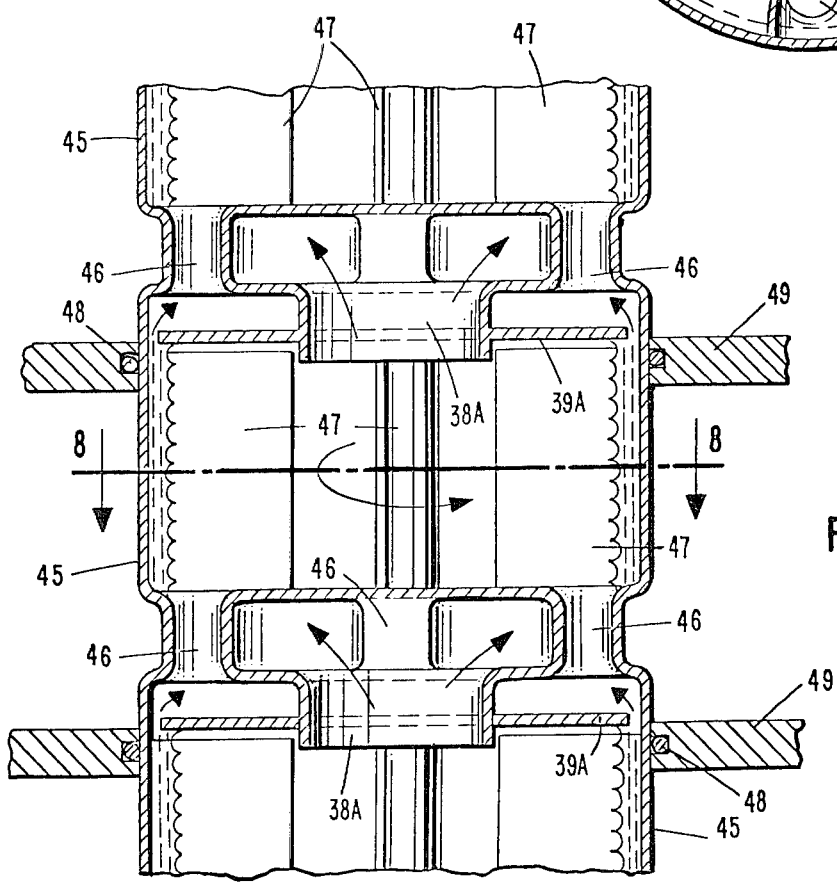
FIG. 7 is a vertical section of a modified flash device of my invention, wherein the impeller blades are integral with side walls of the vessel.

Other flasher configurations can be used to accomplish the vapor-liquid separation and pumping action which fall within the scope of my invention. One such alternate is shown in FIG. 7. Here, each of the vessels 45 rotate to develop the necessary centrifugal head and liquid transfer lines 46 between flashers also rotate. In this arrangement, there is no need for impellers or a drive shaft extending through the several flashers. The flash space in vessel 45 may be completely empty or may contain blades 47 similar to blades 42 of FIGS. 4 and 6 to give better vapor-liquid separation, the blades 47 in this case being attached directly to the vessel walls. Here the vapor outlets are indicated at 38A and such skimmer plates at 39A. The vessels are rotated upon a common axis and supported for rotation by supporting plates indicated at 49 similar to the horizontal partitions 3 referred to above in connection with FIG. 1. As the vessels themselves rotate within suitable openings in such supporting plates or partitions 49 they are sealed against the latter with suitable O-rings 48, as also shown in FIG. 7. FIG. 8 is further illustrative of the positioning of the blades 47 which, as stated, are similar to blades 42 as shown in FIGS. 4 and 6. FIG. 8 further shows the relative positioning of the vapor outlets 38A with respect to the peripherally disposed liquid transfer lines 46.

The principal advantages of the flasher of FIG. 7 over that previously described are the simplicity of construction and the reduced power consumption, which results from the fact that rotational liquid velocity need not be redeveloped in each flash vessel. The principal disadvantages are the greater difficulty of preventing suspended solids in the liquid from being centrifuged out on the vessel walls and the larger diameter and hence higher surface speed at which the sealing means 48 between flash stages must be accomplished.

Figure 5:
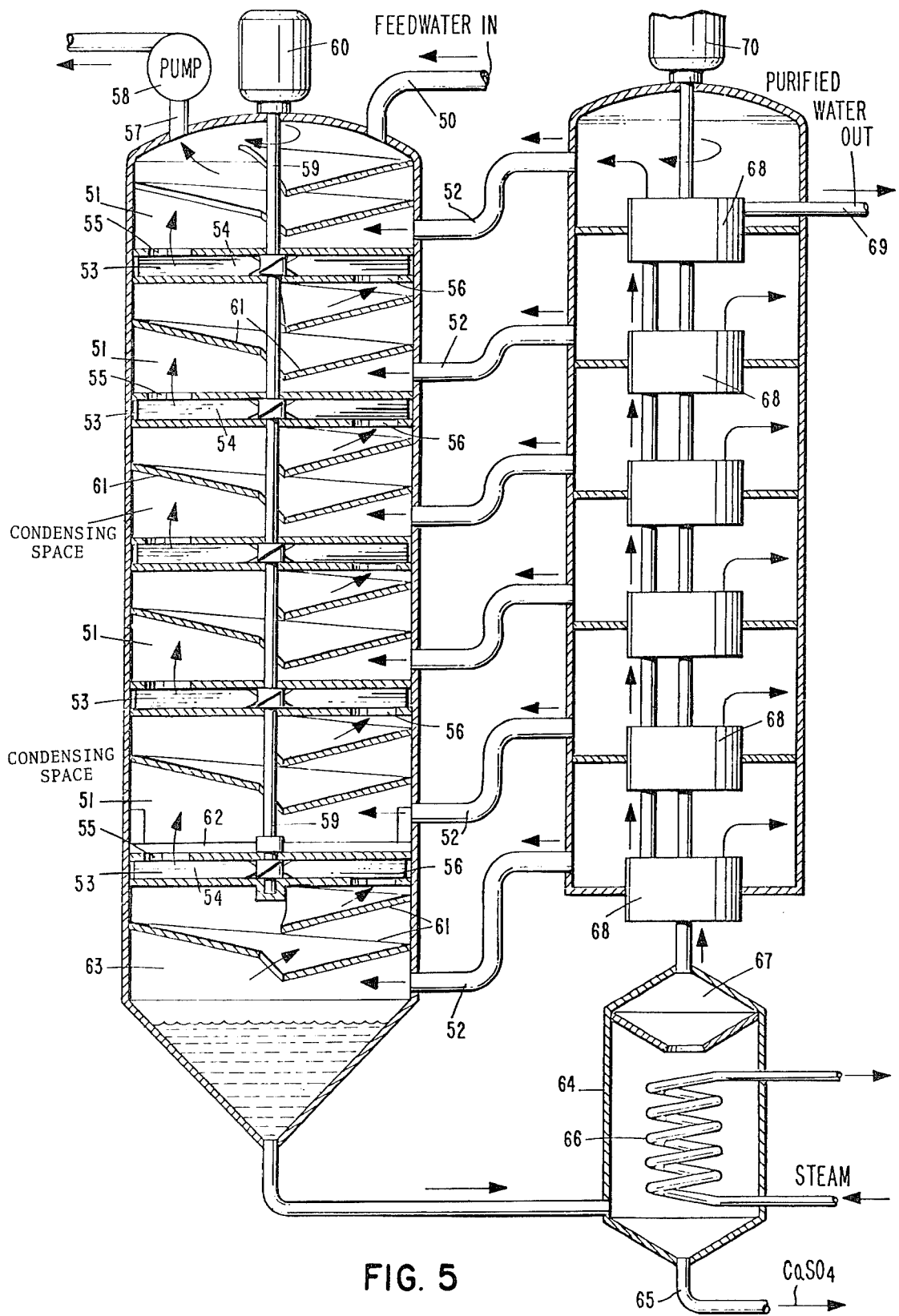
FIG. 5 is illustrative, in diagrammatic fashion, of an alternate use for such flash devices as comprise my invention for interchanging heat between two streams by direct contact of vapor with liquids.
Figure 9:
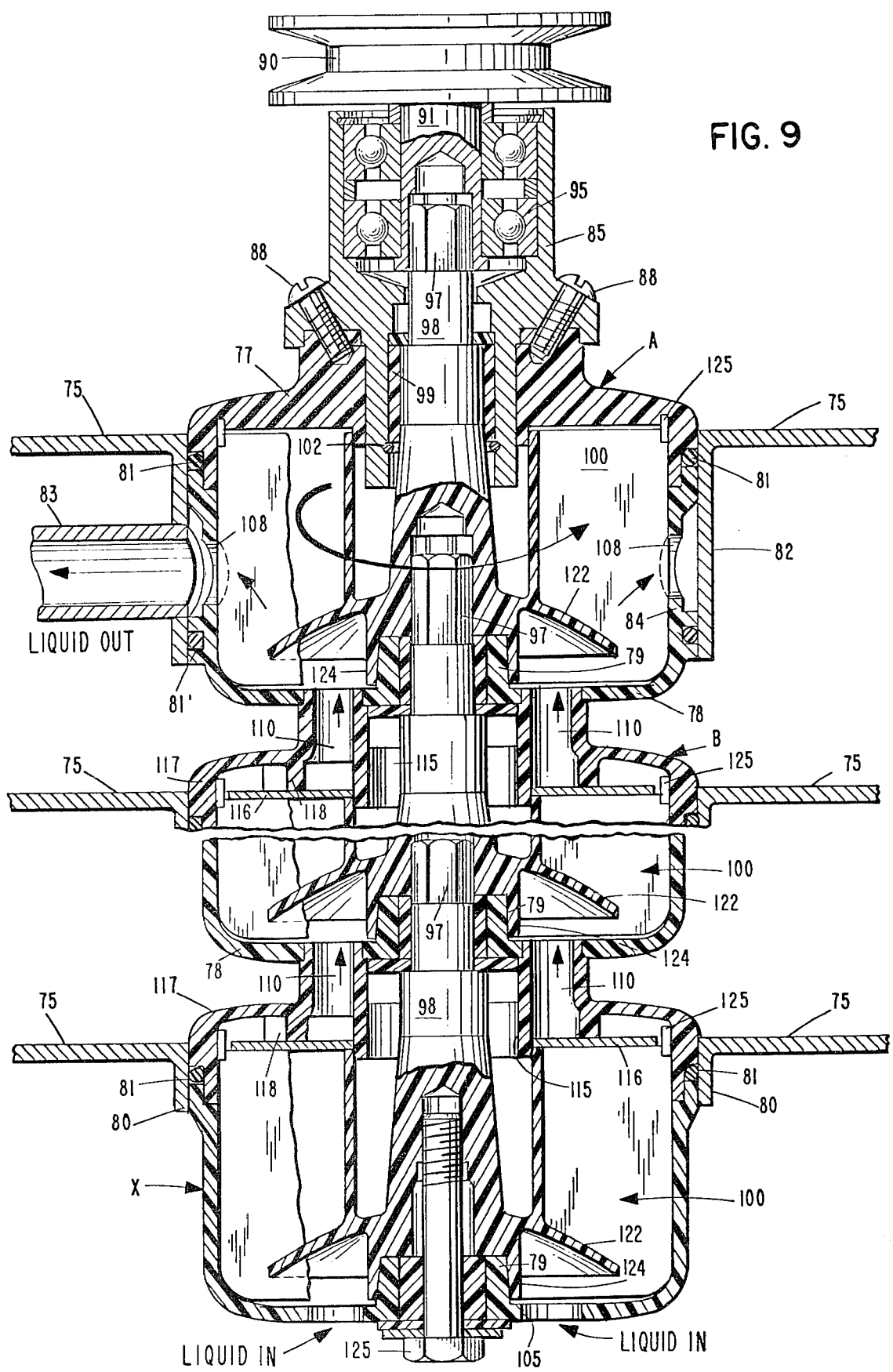
FIG. 9 is a vertical sectional view of an assembly showing the preferred embodiment illustrating the principles of my invention wherein a stacked number of flash devices are utilized and as might be employed in systems in FIGS. 1 and 5; the impellers shown in this Figure are additionally illustrated in FIGS. 13 and 14.

As indicated above, FIG. 9 illustrates an assembly wherein a stacked number of flash devices are utilized in such systems as those more diagrammatically illustrated in FIGS. 1 and 5. With more particular reference to FIG. 9, it is here seen that a series of superimposed vessels for enclosure of the impellers are shown generally at A, B and X. With reference to vessel B, the broken line simply indicates that there may be any reasonable number of intermediate vessels (see FIG. 1, illustrating six), all of which would be of the same type of construction. Each of these vessels except uppermost vessel A is associated with a partition element 75 corresponding to partitions 3 of FIG. 1 and is sealed thereto as by such means as flange 80 and O-ring seal 81.

Uppermost vessel A utilizes much the same configuration as flasher vessels B and X but is used primarily for mounting of drive mechanism 85 and for helping to remove residual flashed liquid from the system via perforations 108 in the body of vessel A leading to an annular space between shell 84 and the downwardly protruding circumferential flange 82 and thence to exit pipe 83. Vessel A therefore has not only the same upper O-ring seal 81 as vessels B and X but also an additional seal 81' to prevent leakage of liquid into the vapor receiving zones between partitions 75.

The intermediate vessels B and lowermost vessel X are all of similar construction in that each of them is provided with a liquid inlet and outlet means external to and concentric with the hub or shaft upon which each of the impellers rotate.

All impellers 100 are mounted for simultaneous rotation and seated upon an upwardly extending circular flange or bushing element 79 and as indicated in FIG. 9. Said bushing elements 79 may be integral with the bottom housing plate 78 of each impeller casing or housing.

Each impeller is interconnected in such fashion as to be driven together in unison and to this end a casing 85 for an appropriate pulley assembly is provided, such casing being secured as by bolts 88 to the top plate or cover portion 77 of the uppermost vessel, vessel A. Suitable drive for the several impellers is provided for by drive pulley 90 which is keyed to a drive shaft 91. An anti-friction assembly 95 is mounted within the casing 85 as a vertical and radial torque combination and this for obvious purposes. Drive shaft 91 is fitted with an internal bottom opening or bore of, for example, hexagonal configuration to receive a fitting 97 of complimentary size, the latter representing a stub shaft at the top of and integral with the first impeller hub 98, this with reference to casing A and the impeller assembly positioned therein. The impellers in each instance are represented by numeral 100. With respect to casing A and the impeller assembly therein hub 98 is fitted within a suitable bushing 99, the latter being held in position by the usual type of retaining ring 102. Each of the impeller shafts or hubs 98, with regard to both the intermediate vessels B as well as the lowermost vessel X, is mounted in similar fashion so that by reason of each fitting 97 being inserted into the hexagonal aperture of the next above impeller hub, all impellers will thus be locked together for rotation in unison.

As seen in this Figure, the "liquid in" legend indicates entrance of liquid via inlets 105 into the bottommost vessel or vessel X. This liquid progresses upwardly during operation through appropriate concentrically disposed openings 110 in each vessel's top plate to the next above vessel. It is finally discharged from the topmost vessel, or vessel A, through openings 108 and as further indicated by the legend "liquid out." Also, each of the intermediate and lowermost vessels, that is, vessels B through X, are provided with vapor outlets 115 which surround the hub 98 of each of the involved impeller arrangements. These outlets discharge in each instance to the space in between each pair of the partitions 75. With respect particularly to intermediate vessels such as vessels B, the relative positioning of the liquid and vapor outlets is further illustrated in FIG. 10. With regard to the lowermost of all vessels, as vessel X shown in FIG. 9, this of course contains the bottom impeller configuration. Such impeller is supported upon the same upstanding flange element 79 in that instance and the impeller assembly is further keyed or locked into interconnection with the bottom plate of vessel X by such media as the usual bolt 125 threaded into the hub 98 of the lowermost impeller 100 and as illustrated in FIG. 9.

Figure 10:
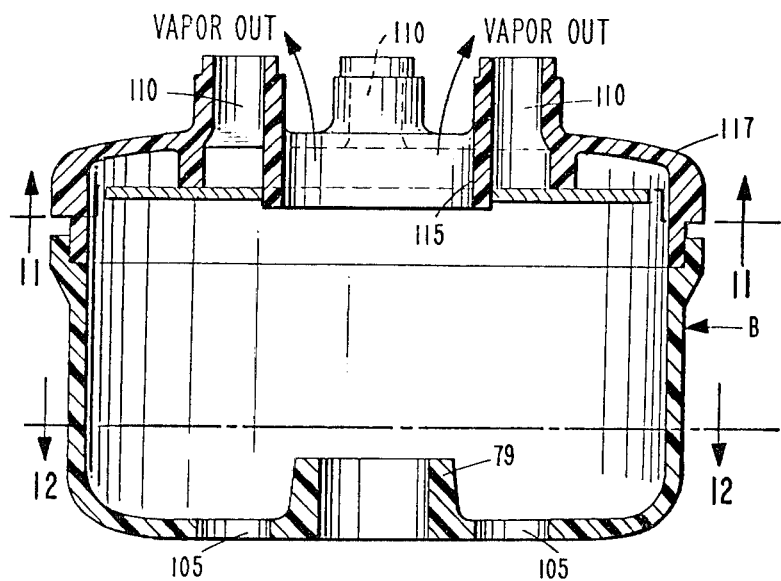
FIG. 10 is a vertical section through one of the flash vessels comprising my invention.
Figure 11:
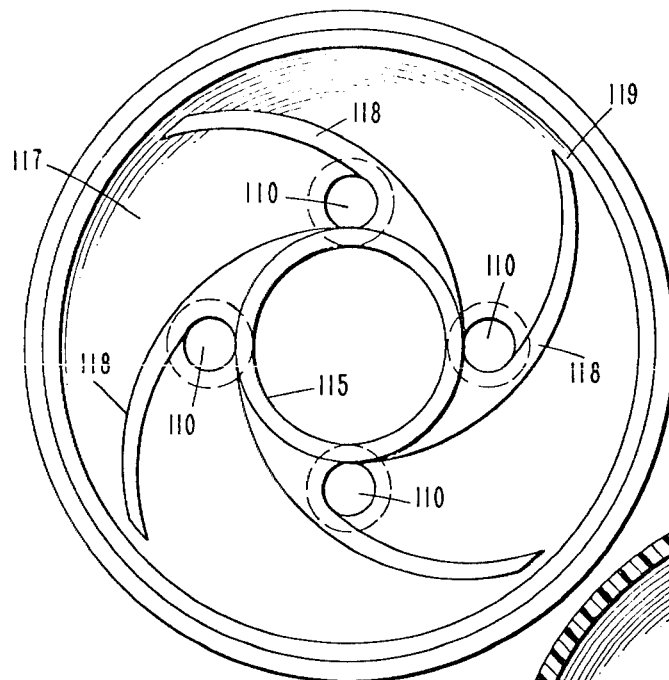
FIG. 11 is a bottom plan view of the top cover of one of the flash vessels taken along line 11—11 of FIG. 10.
Figure 12:
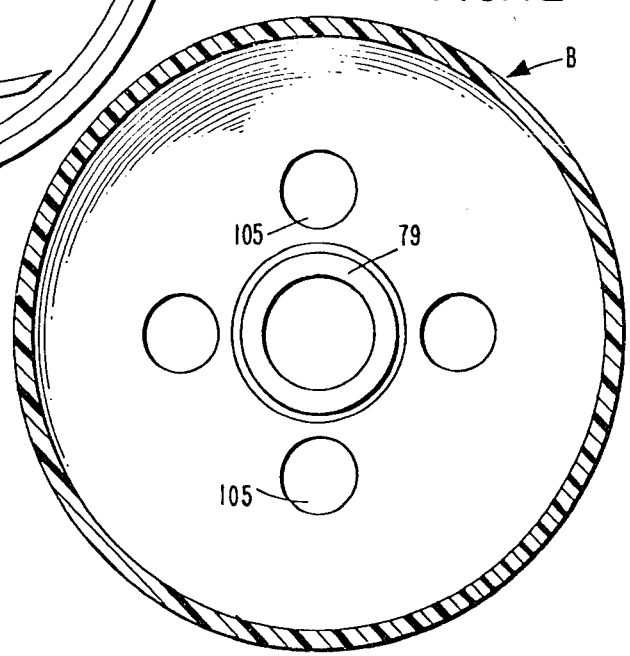
FIG. 12 is a sectional view through the bottom part of the flash vessel taken on the line 12—12 of FIG. 10.
Figure 13:
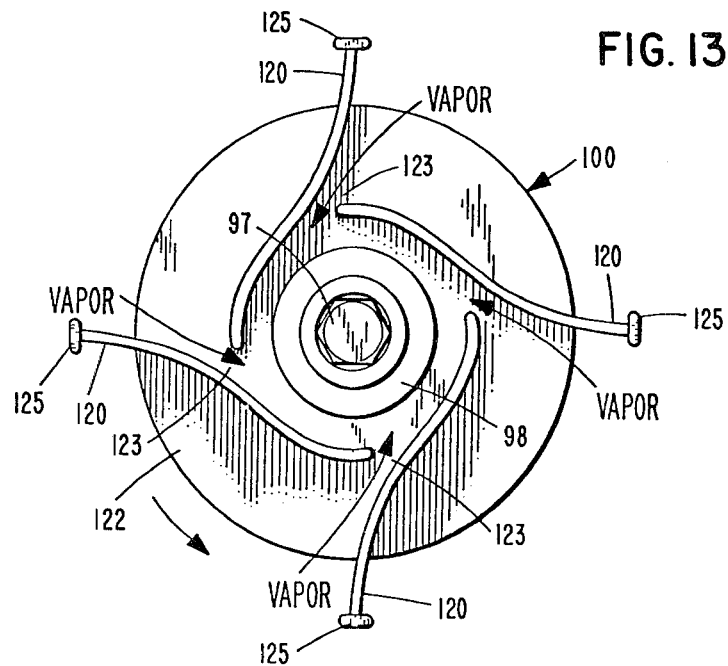
FIGS. 13 and 14 are top and bottom plan views, respectively, of the impellers used in FIG. 9.
Figure 14:
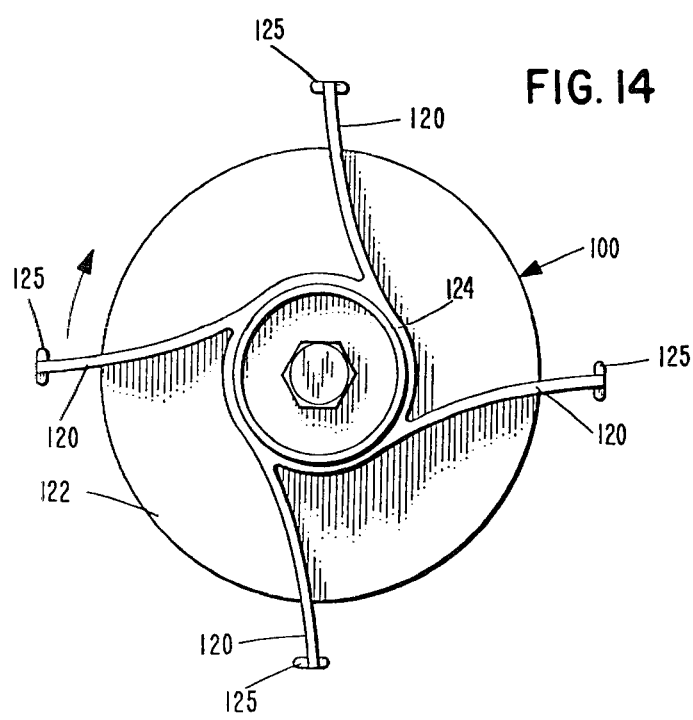

Further with regard to FIG. 10 representing a cross-section of one of the vessels, the course of the vapor flow through the opening 115 is indicated by the arrows there shown. Also, the liquid inlet opening is indicated at 105 and the liquid outlet past skimmer plate 116 to short tubes shown at 110. In addition, FIG. 10 illustrates certain channels formed in the cover plate, represented at 117. These are more clearly delineated in FIG. 11 and have the configuration there shown. The purpose of these channels is to more readily force the impelled fluid toward the several liquid outlets 110. Four converging grooves 117 are formed in the vessel cover and are formed by walls 118. These grooves serve to funnel the liquid discharge from the impellers into the outlets 110. The radially outward ends of walls 118 are terminated short of the walls of the vessel to provide a groove 119 in which scraper blade 125 of impeller blade 120 rides (see FIGS. 13 and 14). The purpose of this scraper element 125 is to remove deposits of solidified matter which through continued use may accumulate in that area. FIGS. 13 and 14 show the specific structure of each of the impellers 100, FIG. 13 being a top view of same and FIG. 14 being a bottom view of such blades. A deflector plate 122, of convex or hemispherical shape, partially separates the upper and lower portions of the impeller blades. As noted in FIG. 13, the upper portions of each adjacent pair of the blades 120 has a space therebetween 123 which defines an opening for the exit of vapor and as indicated by the arrows in FIG. 13. The shape of the blade throughout its vertical extent is the same; however, and as shown in FIG. 14, representing a bottom view thereof, the inner ends of the blades are continuous and blend into a circular flange 124 which is designed to rotatably surround the upstanding bearing member 79. Such arrangement performs a function of sealing off the blade at the bottom center portion thereof, thereby forcing the liquid-vapor outwardly underneath the skirt or deflector plate 122, past the edges thereof, thence upwardly against the wall of the vessel, where a thin sheet of liquid is formed.

While the principal objective of my invention has been to achieve a flashing device or system that could transfer flashing liquid to higher elevations under controlled conditions, my invention has other features that are also highly advantageous. One is that the volume occupied by the flashers is only a small fraction (about 10 to 20%) of the volume needed by conventional flashers. This is a result primarily of the greatly reduced "depth" of liquid in the flashers that is made possible by the development of centrifugal head on the liquid, and of the greatly reduced space needed above the liquid for vapor-liquid separation. Another advantage is that the centrifugal forces on the liquid are much higher than gravitational forces. This permits use of the flashers even in a horizontal configuration and makes their performance insensitive to extraneous motion, such as would be encountered when used aboard a marine vessel. Another advantage is that these flashers permit the liquid to flash closer to the equilibrium temperature of the vapor space. In a conventional flasher as used in multistage flash evaporator, the liquid depth is a foot or more and hydrostatic head of the liquid prevents that portion of the liquid near the bottom of the flash vessel from flashing to the pressure in the vapor space. In my flasher, even though centrifugal forces increase the effective hydrostatic head, the liquid depth normally is so small that the liquid at the outer wall of the flasher is at a substantially lower pressure than the liquid at the bottom of a conventional flasher. Also, the action of the impeller blades, if used, provides a high degree of turbulence that permits all the liquid to be exposed repeatedly to the lowest pressure at the liquid surface, thus further assuring better equlibrium.

It is obvious that there are a number of other applications for my flashers beside the multistage flash evaporator. One would be in conjunction with a conventional backward feed multiple effect evaporator, such as used for concentrating spent cooking liquor from wood pulp manufacture. In this type evaporator, the concentrated liquor is discharged hot from the highest temperature effect. Its heat content can be recovered by flashing to the lower temperature effects in series. This is now done in conventional stationary flashers, but the liquid is viscous and foams badly so only a few flash stages are used, permitting only a fraction of the heat content to be recovered. With my type of flasher, where space requirements are much smaller and where foaming liquids can more easily be handled, it would be practical to flash the hot liquid in a larger number of stages, thereby recovering more of the heat content in a more efficient manner.

Another application of my flasher is for the direct contact heating of another liquid that cannot or need not be heated out of contact with the condensing vapor. An example would be the multistage heating of a scaling liquid that could not be heated in a conventional exchanger containing metallic heating surfaces.

FIG. 5 shows, in diagrammatic form, such an application of my flasher for heating a liquid saturated with $CaSO_4$. Such heating might be needed prior to introduction of the feedwater into a seeded evaporator for further concentration or simply as a means of removing the $CaSO_4$ content by thermal precipitation, as shown, so that a water containing mainly $CaSO_4$ as an impurity could be transformed into a potable or otherwise useful water. This is possible since water saturated with $CaSO_4$ at ambient temperature contains about 2,000 ppm $CaSO_4$ and hence is far above the normal potability limit of 500 ppm total dissolved solids, but when heated to about 300° F. is saturated with $CaSO_4$ at only about 200 ppm. In FIG. 5, the feedwater from line 50 is heated in a series of stages 51 by direct contact with vapor from lines 52 at successively higher temperatures and pressures. Transfer of liquid between stages can be by conventional pumps, by hydrostatic means, of, as shown, by paddle wheels 53 rotating in chamber 54 open at one side at the top and at the other side at the bottom. Thus liquid enters a paddle wheel by opening 55 and leaves by opening 56 in going from one condensing space to the next. The "empty" side of the paddle wheel that returns from opening 56 to opening 55 fills with vapor from the higher pressure stage and transfers it to the next lower pressure stage and thus acts as a vent for non-condensible gases from each stage. The accumulated vents eventually are withdrawn by line 57 and vacuum pump 58. All paddle wheels can be driven from a common shaft 59 by motor 60. Very little power is required of motor 60 since the energy for transfer of liquid from low pressure to high pressure is derived mainly by the transfer of vent gases and vapor from high to low pressure. Although the liquid becomes supersaturated with $CaSO_4$ on being heated, there is little time and little surface on which the $CaSO_4$ can deposit. Deflectors 61 in the condensing spaces, which are provided to break up the liquid stream and provide more contact surface between vapor and liquid, can be elastomer coated or made of flexible metal to prevent $CaSO_4$ accumulation. The paddle wheels 53 and the vessel shell can be similarly treated. As an aid to prevention of solid $CaSO_4$ accumulation on the floor of the condensing spaces, breaker bars 62, with drag chains if necessary, can be attached to shaft 59.

On issuance from the last direct contact heater 63, the liquid, at a temperature on the order of 300° F., is transferred to crystallizer 64, which is seeded with anhydrous $CaSO_4$ crystals to promote a desupersaturation of the entering hot feedwater. There will be an accumulation of solid $CaSO_4$ in this crystallizer, which can be removed by line 65. Net heat supply to the system, needed to provide the thermal driving force for operation of the preheating system, can be added by steam to heater 66 on the crystallizer or by supplying makeup steam instead of flash vapor to the lowermost direct contact heater 63. The hot feedwater, after equilibration with the seeds, is clarified of solids, preferably by an internal clarifier 67 in crystallizer 64 and is then passed to a train of my flashers 68, which are used to supply vapor to the direct contact heaters, by lines 52. The liquid from the uppermost of the flashers 68 is discharged as the purified water product of the system, by line 69. The advantages of my flashers to this system are obvious, being much the same as the advantages of such flashers when used in the falling film multistage flash evaporator. The advantage of the system as a whole is that it can produce potable water from such a feedwater at less than a quarter of the heat consumption of a conventional multistage flash evaporator, which could not be used on this type of feedwater in any event because of the scaling problem. In such a system only thirteen stages are needed to achieve a performance ratio of 40, corresponding to a heat consumption of only 25 Btu per pound of product water. Such systems are useful not only for production of potable water but also for removing $CaSO_4$ from a water intended for cooling purposes, such as in power plant cooling tower circuits.

An illustrative embodiment of the successive pressure reductions in a multistage flash cycle is exemplified by the following description of FIG. 5. Assume that entering feedwater stream 50 is at a temperature of 90° F. and consider a flow quantity of 100 pounds of that stream. If that stream is heated 30° F. in top zone 51, it will require the condensation of about three pounds of water vapor from uppermost flasher 68, entering via uppermost line 52. Very little driving force is needed for the direct contact condensation of steam in a liquid so the condensing temperature of this steam will be only slightly higher than the exit liquid temperature of 120° F. Thus this steam would have a condensing temperature of about 121° F., corresponding to a vapor pressure of 0.12 atmospheres absolute. The flowrate of liquid through the flashers is practically the same as the flowrate through the heaters, so to supply the three pounds of vapor needed by the upper most condensing space requires flashing the liquid 30° F. in the uppermost flasher, or from a vapor temperature of 151° to 121° F. Thus the liquid leaving the next lower flasher will have supplied 151° vapor at a corresponding pressure of 0.26 atmospheres absolute to the second condensing space 51. Vapor at this pressure would be sufficient to heat the liquid from 120° to 150° F., but to do this requires about three pounds more of vapor, or as much vapor as would be provided by flashing liquid from 181° to 151° F. in the corresponding flasher. This stepping-stone sequence proceeds through the connected condenser-flashing spaces with the temperature rise on one heater establishing what must happen all the rest of the way down the ladder. It results in the temperature rise in each condensing space and the temperature drop in each flasher all being approximately the same, or 30° F. in the above illustration. Thus in this illustration, after six stages of heating, the liquid leaving lowermost condensing zone 63 will be at a temperature of 270° F. and will have to be heated by steam condensing in coil 66 to 301° F. before going to lowermost flasher 68, so that flashing 30° F. will give the quantity of 271° vapor needed by lowermost condensing space 63. It can therefore be seen that the vapor temperatures at each stage and hence the vapor pressures in the flashers and the pressure reductions between flashers are determined by the overall system arrangement and not by the design of the flashers. The design of the flashers can influence the pressures and pressure differentials only in two ways, both of which adversely affect the overall efficiency of the system. One is by not allowing the liquid entering a flasher to flash all the way to equilibrium at the vapor space pressure. Thus in the above example, if the liquid left each flasher 1° F. hotter than that corresponding to the vapor pressure, it would leave the bottom flasher at 272° instead of 271° F. This would mean that steam coil 66 would have to heat feed to this flasher to 302° in order to provide the vapor requirements of lowermost condensing space 63. Thus the steam consumption of the process would rise to $32/31=103\%$ of what it should be with properly functioning flashers. It is an aim of my invention to minimize this type of loss, by minimizing the depth of liquid below the vapor-liquid interface in the flashers. The only other way in which flasher design can affect pressure differentials and overall performance is by allowing vapor to escape from a flasher with the liquid. Thus in the above illustration, if the liquid leaving each flasher contained about 1% vapor by weight, it would bypass about one pound of vapor for every three pounds transferred to the condensing spaces. This extra pound of vapor would have to be generated in the lowermost flasher by flashing 40° instead of 30° F., which would necessitate heating with steam coil 66 from 270° to 311° instead of 301° F. This much vapor bypassing thus results in a steam consumption $41/31=133\%$ of ideal. It is an aim of my invention to minimize this type of loss by proper proportioning of skimmer plate and liquid passages and by proper choice of rotational speed such that only liquid can escape from one flasher to the next.

It must be realized that while the above temperatures and temperature differentials are reasonable approximations, they are not exact. Minor variations in specific heats of the streams, latent heats of vaporization or condensation and in relative flow quantities all influence the relative temperature and pressure differentials. These can readily be calculated. Once in operation, the entire system establishes its own equilibrium, without need for control of the intermediate variables. The only control that need be exercised is over the flow rate of entering feedwater via line 50 and the top temperature to which the liquid is heated, which is controlled by variation of steam flow to coil 66.

By analogy it can be seen that exactly the same kind of conditions occur in the conventional multistage flash flowsheet of FIG. 1, with the flasher pressure differences being determined by overall system arrangement rather than by flasher design. The principal difference relative to FIG. 5 is that a heating surface is interposed on the condensing side of FIG. 1. This results in need for a higher temperature difference to transfer heat from the condensing steam to the liquid being heated and thus for higher flasher pressures for a given temperature of liquid leaving a section of the condensing spaces.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. In a system adapted to purify impure liquid in a multistage flash evaporator by the sequential heating and flashing thereof, the combination of:
   (a) a vertically disposed vessel having a series of horizontal partitions to provide a series of superposed condensing spaces therein, and provided with an upper impure liquid sump chamber and lower sump chamber;
   (b) a vertical indirect contact heating surface in said condensing spaces and interconnecting said upper impure liquid chamber with said lower sump chamber whereby impure liquid will be heated and in being heated will condense vapor at successively higher pressures in each successively lower of said condensing spaces as said impure liquid passes downwardly over said heating surface;
   (c) a series of vertically superposed coaxial flash chamber means, each possessing successive lower pressure as a result of the flashing of liquid therein to form both a vapor and liquid stream, wherein said vapor stream is passed to said vertical indirect heating surface to raise the temperature of said downwardly passing impure liquid and each one of said flash chamber means being sealed to one of said partitions and including centrifugal means to force liquid toward the periphery of said flash chamber means and to collect vapor near the axis thereof;
   (d) a conduit in association with each of said flash chamber means to conduct impure liquid from said liquid sump to the lowermost and then sequentially to the uppermost of said flash chamber means;
   (e) means to conduct said vapor from near the axis of each of said flash chamber means to the condensing space laterally adjacent thereto, wherein said vapors are condensed to liquid;
   (f) means to remove said condensed vapor as a purified liquid condensate; and
   (g) means to supply heat from an external source to said impure liquid, either in the lowermost of said superposed condensing spaces or as the liquid is transferred from said liquid sump to the lowermost of said flash chamber means, whereby said system represents a liquid purification system wherein successive pressure reduction is effected by sequential heating and flashing of said liquids.

2. The invention as defined in claim 1 wherein each of said partitions except the lowermost thereof is provided with a vertically disposed vent gas conduit extending from one condensing space to the adjacent higher condensing space thereby to pass vent gas and to carry with it condensate from a lower condensing space sequentially through intermediate condensing spaces to the uppermost condensing space, and means to remove condensate from said upper most condensing space.

3. The invention as defined in claim 2 wherein a heater means is provided to supply a condensible heating medium, said heater means being interconnected with said lowermost condensing space for said condensible medium, and an inlet means is provided to feed impure liquid to said upper impure liquid chamber.

4. A flash device for use in multistage flash evaporator systems utilizing a flash tower provided with at least one vapor condensing space therein formed by lateral partitions within said tower, said flash device comprising:
   (a) a cylindrical, stationary vessel having an inlet line into the bottom thereof for liquid to be flashed;
   (b) an impeller provided with impeller blades within said vessel having means for rotation thereof at a speed to force said liquid to the outer wall to thereby form a vapor-liquid interface;
   (c) a skimmer plate near the top of said vessel of a diameter less than the inside diameter of said vessel to permit escape of liquid only therethrough;
   (d) a vapor outlet near the axis of rotation of said impeller, said outlet being adapted to lead into said condensing space; and
   (e) means for sealing said vessel to one of said partitions.

5. An apparatus for producing a number of vapor streams at successively lower pressures by the flashing of a hot liquid comprising:
   (a) means for introducing a heated liquid into a first flasher vessel adapted to be maintained under a reduced pressure which is below the boiling pressure of said liquid;
   (b) means for subjecting said liquid to sufficient centrifugal force to cause said liquid to collect along the peripheral portions of said vessel and to form a first vapor stream;
   (c) means comprising openings located on the axis of said vessel for the upward withdrawal of said flashed first vapor stream formed as a result of said reduced pressure;
   (d) means for withdrawing liquid collected on said peripheral portions of said vessel, said means being sufficiently restricted to allow only liquid to escape in an upward flow path to a second upstream vessel possessing pressure reduction means;
   (e) means for passing said withdrawn liquid to said second upstream vessel similar to said first vessel and coaxial therewith, said second vessel being adapted to again flash said withdrawn liquid at a still lower pressure to form a second vapor stream;
   (f) means for removing said second flashed vapor stream from said second vessel in an upward flow-path; and
   (g) means for withdrawing liquid from said second vessel.

6. A flash device for use in multistage flash evaporator systems comprising:
   (a) a stationary vessel of circular cross-section having an inlet line into one end thereof for liquid to be flashed;
   (b) an impeller within said vessel having means for rotation thereof at a speed to force said liquid to the outer wall of the vessel to thereby form a vapor-liquid interface;
   (c) means near the end opposite the liquid inlet end of said vessel to permit escape of liquid only therethrough; and,
   (d) means near the end opposite the liquid inlet of said vessel and near the axis thereof to permit escape of vapor only therethrough.

7. An apparatus for producing a number of vapor streams at successively lower pressures by the flashing of a hot liquid comprising:
   (a) a means for introducing a heated liquid into a first flasher vessel adapted to be maintained under a reduced pressure which is below the boiling pressure of said liquid;

(b) means for subjecting said liquid to sufficient centrifugal force to cause said liquid to collect along the peripheral portions of said vessel and to form a vapor stream;

(c) means comprising openings located on the axis of said vessel for the upward withdrawing of flashed vapor formed as a result of said flashing wherein said removal occurs between said first vessel and another downstream flasher vessel;

(d) means for withdrawing liquid collected on said peripheral portions of said vessel, said means being sufficiently restricted to allow only liquid to escape in an upward flowpath to a second upstream flasher vessel having a lower pressure than said first flasher vessel;

(e) means for passing said withdrawn liquid to said second upstream vessel similar to said first vessel and coaxial therewith, said second vessel being adapted to again flash said withdrawn liquid at a still lower pressure;

(f) means for removing flashed vapor from said second vessel; and (g) means for withdrawing liquid from said second vessel.

8. A method of flashing a superheated liquid in a series of stages to produce a number of vapor streams at successively lower temperatures comprising:

(a) introducing said superheated liquid into a first vessel of circular cross-section maintained under reduced pressure below the vapor pressure of said superheated liquid;

(b) subjecting said liquid to sufficient centrifugal force by means of an impeller rotating in said vessel to cause said liquid to collect on the walls of said vessel;

(c) withdrawing in an upward flowpath flashed vapor formed by the reduction of pressure from near the axis of said vessel;

(d) withdrawing said liquid collected on the walls of said vessel through passages sufficiently restricted to allow only liquid to escape;

(e) passing said withdrawn liquid to a second vessel and therein flashing said liquid to still lower pressure;

(f) said second vessel being similar to said first vessel and containing an impeller coaxial with said impeller in said first vessel and rotating in common therewith;

(g) discharging said flashed vapor from said upward withdrawal from said first vessel radially from a space between said first and said second vessels; and (h) discharging said flashed vapor from said second vessel radially from a space between said second vessel and any subsequent flash vessel or impeller drive means.

9. In a system adapted to purify impure liquid in a multistage flash evaporator by the sequential heating and flashing thereof, the combination of:

(a) a vertically disposed vessel having a series of horizontal partitions to provide a series of superposed condensing spaces therein, and provided with an upper impure liquid sump chamber and lower sump chamber;

(b) a vertical indirect contact heating surface in said condensing spaces and interconnecting said upper impure liquid chamber with said lower sump chamber whereby impure liquid will be heated and in being heated will condense vapor at successively higher pressures in each successively lower of said condensing spaces as said impure liquid passes downwardly over said heating surface;

(c) a series of vertically superposed coaxial flash chamber means, each of said means being sealed into one of said partitions and being in communication with the condensing space laterally adjacent thereto by means of an opening near the axis of said flash chamber means, whereby each successively higher flash chamber means is maintained at a lower pressure;

(d) a conduit in association with each of said flash chamber means to conduct impure liquid from said liquid sump to the lowermost and then sequentially through the intermediate to the uppermost of said flash chamber means, whereby liquid may be exposed to successively lower pressures, forming flash vapors in each of said flash chamber means;

(e) a rotating impeller in each of said flash chamber means to force liquid toward the periphery of said flash chamber means and allow vapor to escape near the axis thereof to said condensing space laterally adjacent thereto, wherein said vapors are condensed to liquid;

(f) means to remove said condensed vapor as a purified liquid condensate; and (g) means to supply heat from an external source to said impure liquid, either in the lowermost of said superposed condensing spaces or as the liquid is transferred from said liquid sump to the lowermost of said flash chamber means, whereby said system represents a liquid purification system wherein successive pressure reduction is effected by sequential heating and flashing of said liquids.

* * * * *